(12) United States Patent
Chang (10) Patent No.: US 9,038,853 B2
(45) Date of Patent: May 26, 2015

(54) SANITIZED VENDING MACHINE AND METHOD

(76) Inventor: Kil Jae Chang, Anyang (KR)

( * ) Notice: Subject to any disclaimer, the term of this patent is extended or adjusted under 35 U.S.C. 154(b) by 164 days.

(21) Appl. No.: 13/507,808

(22) Filed: Jul. 30, 2012

(65) Prior Publication Data

US 2013/0048662 A1    Feb. 28, 2013

Related U.S. Application Data

(60) Provisional application No. 61/575,725, filed on Aug. 26, 2011, provisional application No. 61/631,747, filed on Jan. 10, 2012.

(51) Int. Cl.
*G07F 11/62* (2006.01)
*B65G 59/06* (2006.01)
*G07F 13/10* (2006.01)
*G07F 11/44* (2006.01)

(52) U.S. Cl.
CPC ............... *G07F 13/10* (2013.01); *G07F 11/44* (2013.01)

(58) Field of Classification Search
USPC ............... 221/92, 93, 95, 112, 113, 123, 124, 221/133, 221
See application file for complete search history.

(56) References Cited

U.S. PATENT DOCUMENTS

| 1,311,170 A | 7/1919 | Lockwood et al. |
| 1,666,008 A | 4/1928 | Graffenberger |
| 1,952,447 A * | 3/1934 | Madden ........................ 141/107 |
| 2,370,848 A | 3/1945 | Doggett |
| 2,542,067 A | 2/1951 | Waite et al. |
| 2,559,063 A * | 7/1951 | Bremer et al. ..................... 221/6 |
| 2,834,511 A | 5/1958 | Booth |
| 2,880,906 A | 4/1959 | Probasco |
| 2,956,706 A | 10/1960 | Austgen et al. |
| 3,279,650 A | 10/1966 | Maxwell |
| 3,618,642 A * | 11/1971 | Beaulieu .......................... 141/1 |

(Continued)

FOREIGN PATENT DOCUMENTS

| GB | 817188 A | 7/1959 |
| JP | 2009163447 A | 12/2007 |

OTHER PUBLICATIONS

UK Combined Search and Examination Report in UK Application No. GB1213554.7 of Kil-Jae Chang, Date of Report Dec. 3, 2012, 2 pages (this UK application is counterpart to above-identified US application).

*Primary Examiner* — Gene Crawford
*Assistant Examiner* — Kelvin L Randall, Jr.
(74) *Attorney, Agent, or Firm* — John R. Flanagan (57) ABSTRACT

A sanitized vending machine includes product and cup dispensing mechanisms and an actuation mechanism. The product dispensing mechanism, holding one or more product items, rotates through a product dispensing cycle to dispense them. The cup dispensing mechanism, holding a stack of cups, rotates through a cup dispensing cycle to dispense a cup to a predetermined position. The dispensing cycles occur in a predetermined sequence so as to enable the dispensed product items to be received in a previously dispensed cup. The dispensing mechanisms respectively include rotatable first and second driven gears drivingly interfaced to rotate during respective product and cup dispensing cycles. The actuation mechanism includes a handle and a rotatable drive gear drivingly interfaced with the first driven gear. When the handle is turned by a user through an actuation cycle the driven gears rotate the respective mechanisms through respective product and cup dispensing cycles.

17 Claims, 6 Drawing Sheets

(56) References Cited

U.S. PATENT DOCUMENTS

| | | | |
|---|---|---|---|
| 3,800,400 A * | 4/1974 | Mistarz et al. | 29/426.3 |
| 4,094,345 A | 6/1978 | Deziel | |
| 4,226,269 A * | 10/1980 | Carr et al. | 141/361 |
| 4,655,266 A | 4/1987 | Ciekanski | |
| 4,742,937 A | 5/1988 | Blom | |
| 4,944,337 A * | 7/1990 | Credle et al. | 141/174 |
| 5,029,737 A * | 7/1991 | Yamamoto | 222/526 |
| 5,058,630 A * | 10/1991 | Wiley et al. | 141/1 |
| 5,067,308 A * | 11/1991 | Ward | 53/471 |
| 5,400,838 A * | 3/1995 | Schjerven et al. | 141/174 |
| 6,053,359 A * | 4/2000 | Goulet et al. | 221/221 |
| 6,378,724 B1 | 4/2002 | Chang | |
| 6,536,625 B2 | 3/2003 | Chang | |
| 7,066,351 B2 | 6/2006 | Chang | |
| 7,267,216 B1 | 9/2007 | Chang | |
| 7,743,942 B1 | 6/2010 | Chang | |
| 8,721,162 B2 * | 5/2014 | Claesson et al. | 366/150.1 |
| 2006/0131323 A1* | 6/2006 | Akuzawa et al. | 221/123 |
| 2008/0164274 A1* | 7/2008 | Stettes | 221/5 |
| 2013/0243917 A1* | 9/2013 | Nevarez et al. | 426/416 |
| 2014/0034666 A1* | 2/2014 | Woods et al. | 221/267 |

* cited by examiner

SANITIZED VENDING MACHINE AND METHOD

This patent application claims the benefit of U.S. provisional application No. 61/575,725 filed Aug. 26, 2011 and U.S. provisional application No. 61/631,747 filed Jan. 10, 2012. The disclosures of said provisional applications are hereby incorporated herein by reference thereto.

BACKGROUND OF THE INVENTION

1. Field of the Invention

The present invention generally relates to vending machines and, more particularly, is concerned with a sanitized vending machine and method.

2. Description of the Prior Art

Most prior art bulk coin-operated vending machines dispense their product items, such as candy or gum, into a non-removable cup fixed on, and ordinarily openable by manipulation of a pivotal flap mounted on the outside of, the housing of the machine which can be contacted and thus potentially contaminated by users' hands. The inventor of the subject matter disclosed herein has discerned that it is likely there are many potential users who would prefer alternative approaches for items to be dispensed from bulk vending machines so that the dispensed items cannot be contaminated through contact with parts of the vending machines which can be contacted and contaminated by users. An innovation which attempted to provide one alternative approach is disclosed in U.S. Pat. No. 7,066,351 by the inventor of the subject matter disclosed herein.

However, it is perceived by the inventor of the subject matter disclosed herein that a need still exists for other alternative approaches to sanitized dispensing from bulk coin-operated vending machines.

SUMMARY OF THE INVENTION

The present invention provides a sanitized vending machine and method that are designed to overcome the above-described problem and satisfy the aforementioned need. The sanitized vending machine and its method of operation prevents all users from contaminating product items and parts of the machine that contact the product items, by only allowing the occurrence of certain actions within the machine and behind a locked external access door on the machine, and thus inaccessible to all users, which result in, first, dispensing a cup from a stack thereof, second, dispensing one or more selected product items from a supply thereof into the dispensed cup and, third, unlocking the access door to enable removal of the dispensed cup containing the product items. The dispensed cup with the product items can only be removed from the machine upon the door being unlocked due to a given user operating the machine to make a purchase through depositing the required coins into the machine and turning an external handle on the machine through a given actuating cycle.

Accordingly, in one aspect the present invention provides a sanitized vending machine which includes a product dispensing mechanism, a cup dispensing mechanism and an actuation mechanism. The product dispensing mechanism is adapted to hold a plurality of product items and rotate through a product dispensing cycle during which the product dispensing mechanism dispenses one or more of the product items. The product dispensing mechanism includes a first driven gear for undergoing rotation with the product dispensing mechanism during the product dispensing cycle. The cup dispensing mechanism is adapted to hold at least one stack of cups and rotate through a cup dispensing cycle during which the cup dispensing mechanism dispenses a cup from the stack to a predetermined position. The respective product and cup dispensing cycles occur in a predetermined sequence so as to enable the dispensed product items to be received in a cup previously dispensed to the predetermined position. The cup dispensing mechanism includes a second driven gear drivingly interfaced with the first driven gear of the product dispensing mechanism for undergoing rotation with the cup dispensing mechanism during the cup dispensing cycle. The actuation mechanism includes a rotatable shaft, a drive gear and a handle. The drive gear is mounted to the shaft so as to undergo rotation with the shaft, the drive gear being drivingly interfaced with the first driven gear of the product dispensing mechanism. The handle is mounted to the shaft and adapted to be turned to rotate the shaft and the drive gear therewith through an actuation cycle such that when the handle is turned by a user through the actuation cycle the first and second driven gears respectively rotate with the mechanisms through respective product and cup dispensing cycles.

In another aspect the present invention provides a sanitized vending method which includes holding a plurality of product items in a product dispensing mechanism, rotating the product dispensing mechanism through a product dispensing cycle to dispense one or more of product items, holding a stack of cups in a cup dispensing mechanism, and rotating the cup dispensing mechanism through a cup dispensing cycle to dispense a cup to a predetermined position, the respective product and cup dispensing cycles occurring in a predetermined sequence so as to enable the dispensed product to be received in a cup previously dispensed to the predetermined position. The sanitized vending method also includes turning a handle through an actuation cycle to: rotate a drive gear interconnected to the handle; rotate a first driven gear intermeshed with the drive gear; rotate the product dispensing mechanism supporting the first driven gear through a product dispensing cycle; rotate a second driven gear intermeshed with the first driven gear; and rotate the cup dispensing mechanism supporting the second driven gear through a cup dispensing cycle.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
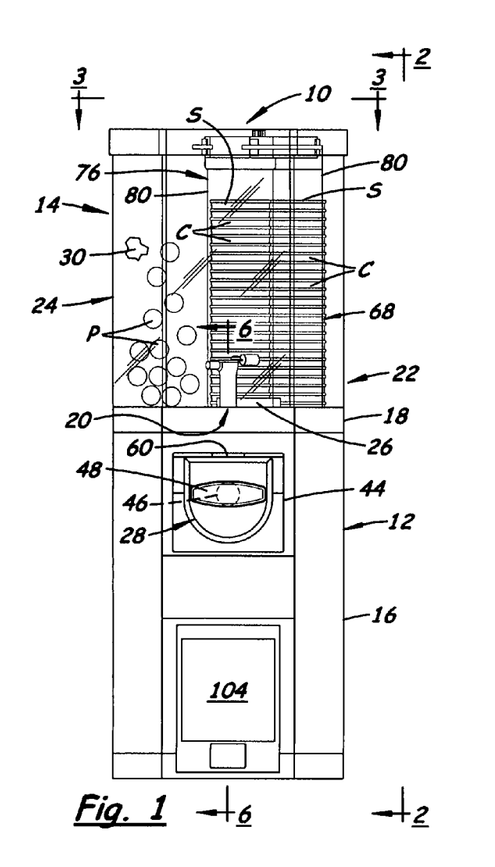
FIG. 1 is a front elevational view of an exemplary embodiment of a sanitized vending machine in accordance with the present invention.
Figure 2:
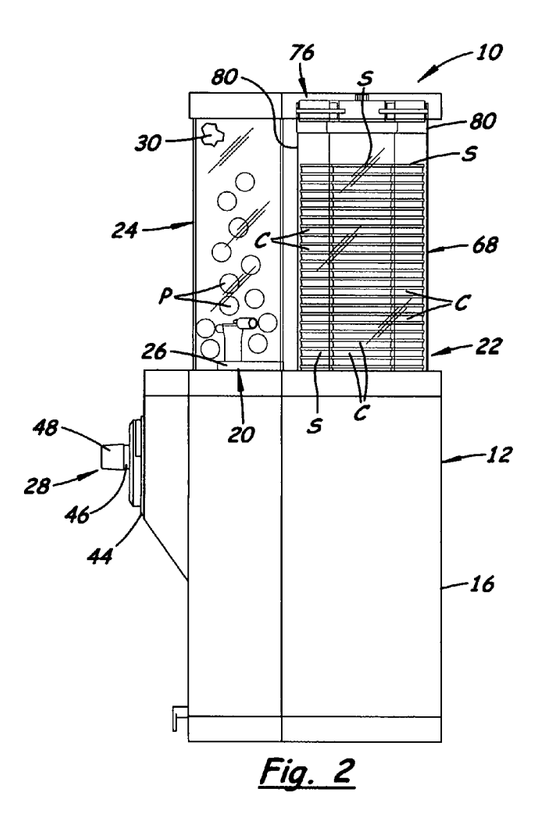
FIG. 2 is a side elevational view of the machine as seen along line 2-2 in FIG. 1.
Figure 3:
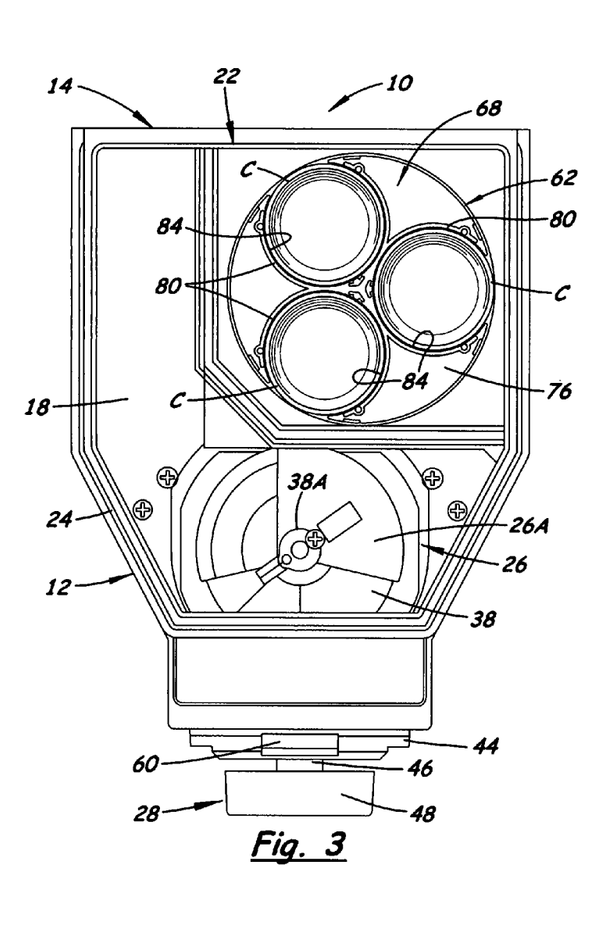
FIG. 3 is a top plan view of the machine as seen along line 3-3 in FIG. 1.

Referring to the drawings, and particularly to FIGS. 1-3, there is illustrated an exemplary embodiment of a coin-operated sanitized vending machine, generally designated 10, in accordance with the present invention. The sanitized vending machine 10 basically includes a housing 12 and a vending unit 14. The housing 12 includes an upright base 16 and substantially horizontal top platform 18 peripherally supported above the upright base 16 upon an upper edge thereof. The vending unit 14 includes a product vending apparatus 20 and a cup dispenser apparatus 22 interfaced and supported in a substantially tandem arrangement with one another by the top platform 18 of the housing 12 such that the cup dispenser apparatus 22 is located behind the product vending apparatus 20.

Referring to FIGS. 1-3, 5 and 6, the product vending apparatus 20 of the vending unit 14 includes a merchandise storage magazine 24, a product dispensing mechanism 26, and a coin-operated actuation mechanism 28. The merchandise storage magazine 24 is supported upright by the top platform 18 above the housing 12 and defines a chamber 30 adapted for holding a plurality of product items P to be dispensed one or more at a time. The top platform 18 of the housing 12 has a well structure 32 affixed about and depending below an interior edge 33 of the platform 18 defining an opening 34 in the top platform 18.

Figure 5:
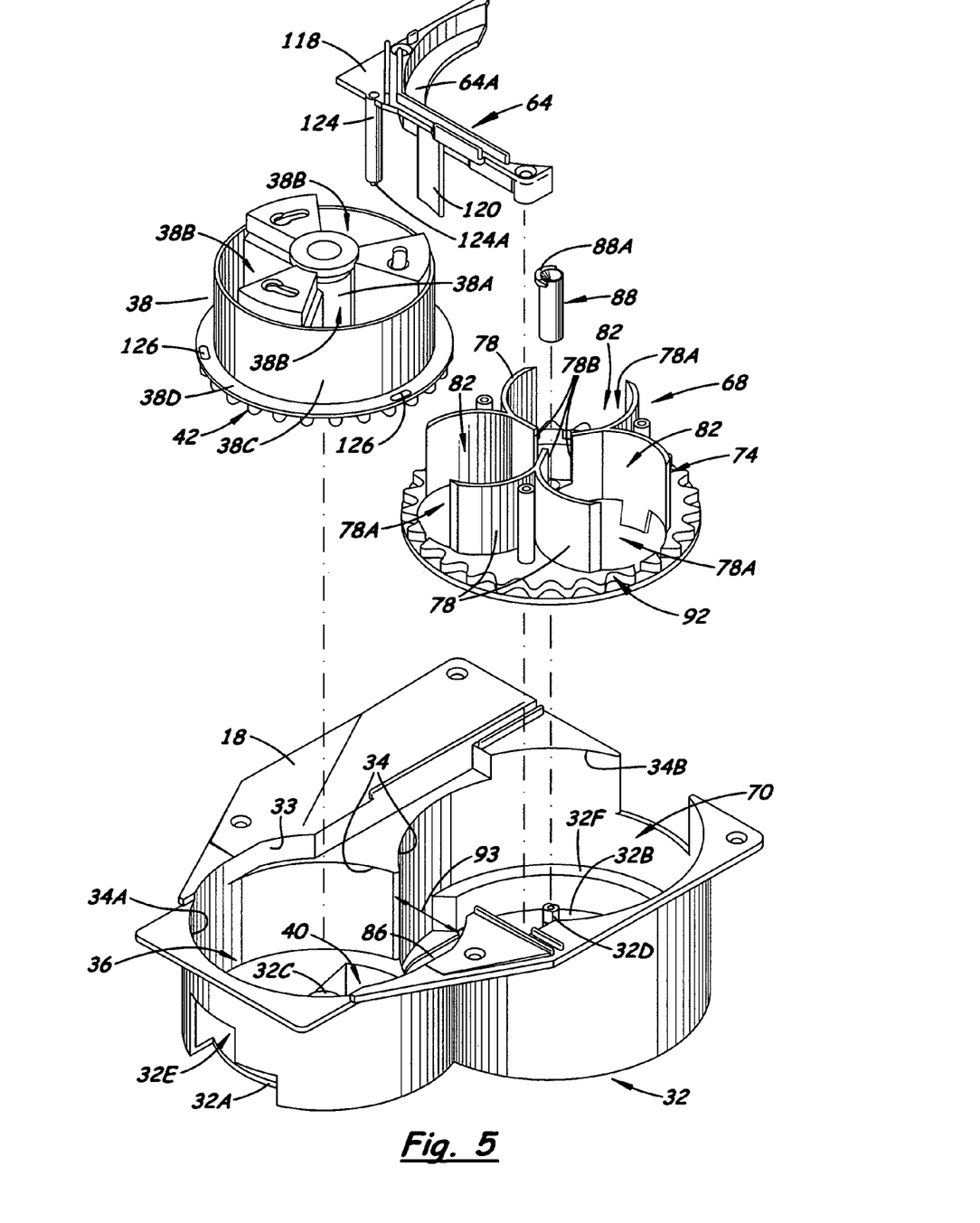
FIG. 5 is an exploded perspective view of a well structure, a product dispensing mechanism, a cup dispensing mechanism, and outer and inner cup separator devices employed in the machine as seen in FIG. 6.
Figure 6:
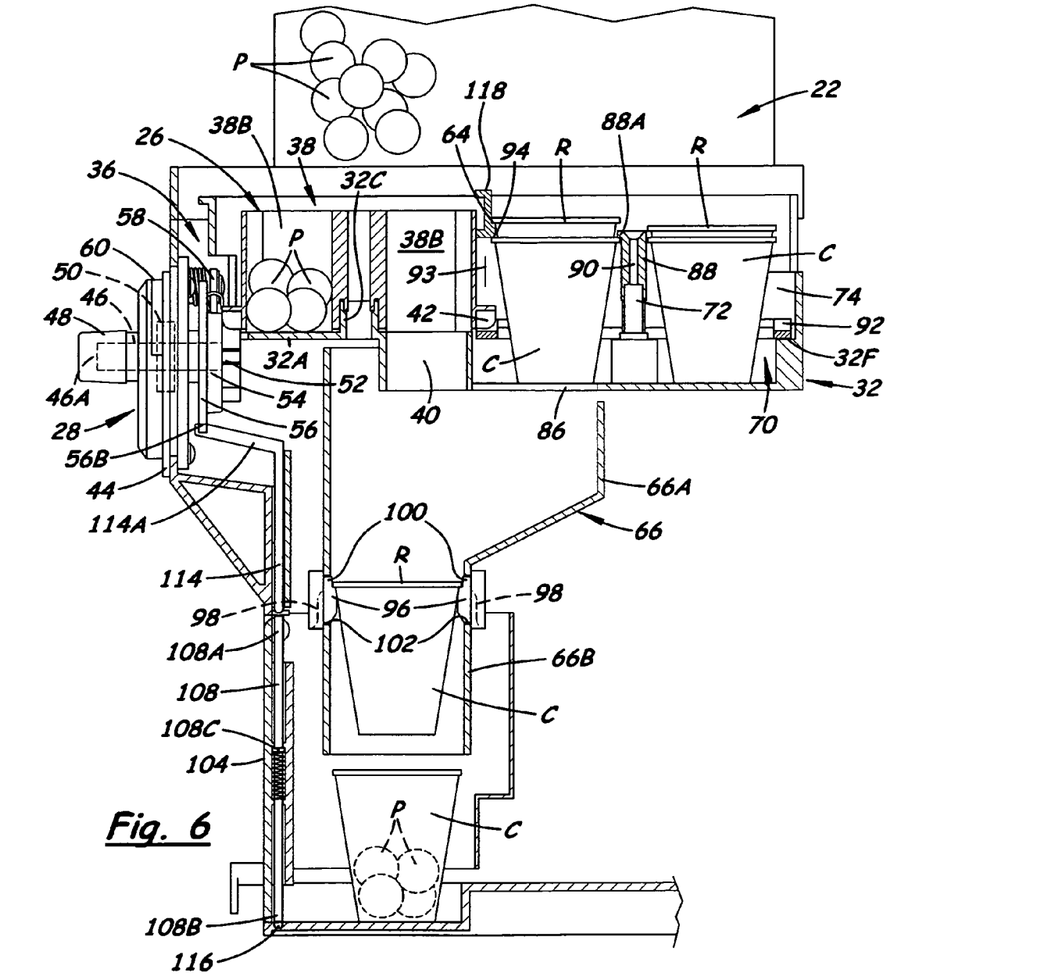
FIG. 6 is an enlarged vertically foreshortened view of the machine, with portions in sectional form, as seen generally along line 6-6 in FIG. 1.
Figure 7:
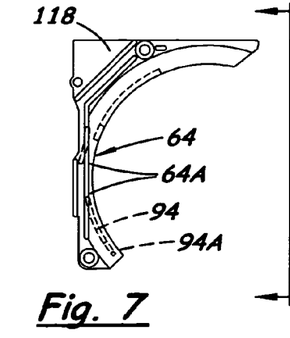
FIG. 7 is an enlarged top plan view of the outer cup separator device of FIGS. 5 and 6.
Figure 8:
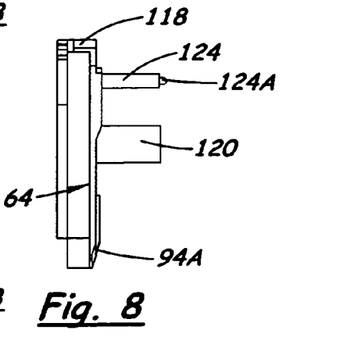
FIG. 8 is a side elevational view of the outer cup separator device as seen along line 8-8 in FIG. 7.

The product dispensing mechanism 26 includes a product dispensing device 38 disposed through a front portion 34A of the opening 34 and within a front cavity 36 of the well structure 32 above a front bottom wall 32A thereof. The product dispensing device 38 is rotatably supported by a central tubular portion 38A thereof which fits over a pedestal 32C attached on and extending upwardly from the front bottom wall 32A. The product dispensing device 38 underlies the chamber 30 of the storage magazine 24 to receive the predetermined number of product items from the storage magazine 24 into each compartment 38B of the product dispensing device 38 radially extending outwardly from and circumferentially displaced about the central tubular portion 38A thereof. Upon rotation of the product dispensing device 38 through 120° of a 360° circular path of travel during each product dispensing cycle, the product items received in a given one of the compartments 38B are successively carried by the product dispensing device 38 under a stationary cover portion 26A of the product dispensing mechanism 26 and across an opening 40 in the front bottom wall 32A of the well structure 32 at which the product items then fall (in other words, are dispensed) through the opening 40.

The product dispensing device 38 also includes a first driven gear 42 defined about its lower periphery portion 38C. The well structure 32 has an opening 32E at a front end of the front cavity 36 facing the rear of the coin-operated actuation mechanism 28 of the product vending apparatus 20. Front portions of the product dispensing device 38 and the first driven gear 42 project through the front end opening 32E of the well structure 32 so that the first driven gear 42 can maintain an operative interfaced or driven relationship with the coin-operated actuation mechanism 28 as will be described hereinafter.

Referring to FIGS. 1-4 and 6, the coin-operated actuation mechanism 28 includes a mounting plate 44, a shaft 46, a handle 48, a coin carrier 50 and a drive gear 52. The mounting plate 44 mounts the coin-operated actuation mechanism 28 to the base 16 of the housing 12 by seating into an open top slot (not shown) defined in the housing base 16 below the upper edge thereof and forwardly of the product dispensing mechanism 26. The shaft 46 is rotatably mounted through and by the mounting plate 44 such that outer and inner end portions 46A, 46B of the shaft 46 extend to and are disposed at the exterior and interior of the housing base 16. The handle 48 is attached on the outer end portion 46A of the shaft 46 and thus disposed at the exterior of the housing 12 where the handle 48 may be gripped and turned by a user. The drive gear 52 is attached on the inner end portion 46B of the shaft 46 and thus disposed in the interior of the housing 12. The coin carrier 50 is attached along the shaft 46 and disposed in the interior of the housing between and spaced from the handle 48 and the drive gear 52. A user upon turning the handle 48 concurrently causes rotation of the shaft 46, coin carrier 50 and drive gear 52 within the housing 12. A one-way ratchet gear 54 is formed on a rear face of a wheel 56 attached along the shaft 46 in the interior of the housing 12 between the coin carrier 50 and drive gear 52. The ratchet gear 54 is engaged by a spring-loaded pawl 58 so that the shaft 46 can only be rotated in one direction, namely counterclockwise, as viewed in FIG. 4, upon turning the handle 48 clockwise, as viewed in FIG. 1. A peripheral edge portion 56A of the wheel 56 extends radially outward beyond the ratchet gear 54 and is provided with a recess or notch 56B at a six o'clock position about the wheel peripheral edge portion 56A. The purpose of the notch 56B will be explained hereinafter.

Figure 4:
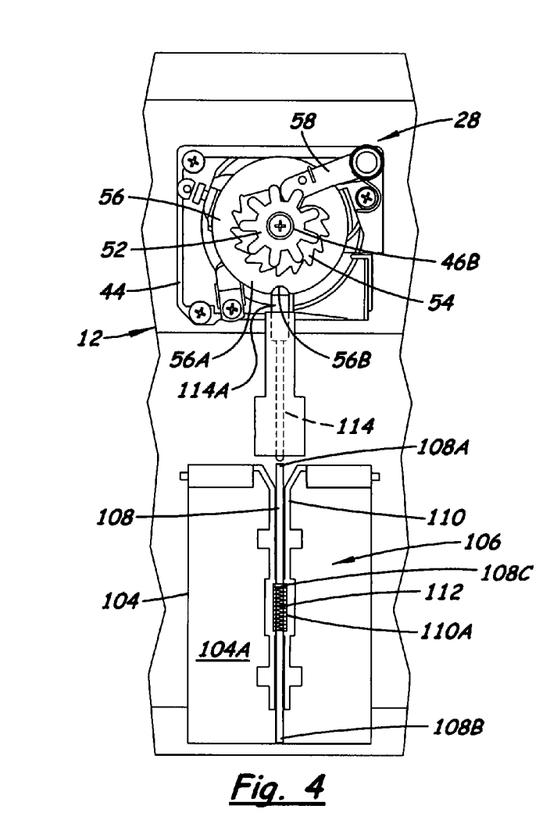
FIG. 4 is an enlarged fragmentary elevational interior rear view of the front of the machine.

During a given actuation cycle, at least one coin is deposited by a user through a coin slot 60 along the top of the mounting plate 44. The coin is received by the coin carrier 50 which holds the coin as the handle 48 is turned by the user and the shaft 46, coin carrier 50 and drive gear 52 therewith are rotated through a 360° path of travel during the given actuation cycle. The rotation of the coin carrier 50 transfers the coin to and releases it at a coin storage location (not shown) in the housing base 16. The rotation of the drive gear 52, which underlies and drivingly meshes, interfaces or engages directly with the first driven gear 42 on the rotatable dispensing device 38, causes rotation of the first driven gear 42 and thus the product dispensing device 38 therewith. The ratio of the sizes of the respective gears 42, 52 is such that the first driven gear 42 and thus the product dispensing device 38 rotate through 120° each dispensing cycle in response to rotation of the shaft 46 and drive gear 52 by the turning of the handle 48 through the entire 360° circular path of travel during the given actuation cycle. Thus, the dispensing of one or more product items occurs from a successive one of the compartments 38B of the product dispensing device 38 through the product dispensing opening 40 in the front bottom wall 34A of the well structure 34 during each actuation cycle of the coin-operated actuation mechanism 28 of the product vending apparatus 20 of the vending unit 14.

Referring to FIGS. 3 and 5-8, the cup dispenser apparatus 22 of the vending unit 14 includes a cup dispensing mechanism 62, outer and inner cup separator devices 64, 88 and a cup drop chute 66. The cup dispensing mechanism 62 includes a cup magazine or holder device 68 disposed within a rear cavity 70 of the well structure 32 and being rotatably supported on a central pedestal 32D affixed upright on a rear bottom wall 32B of the well structure 32 (which rear bottom wall 32B is at a level lower than the level of the front bottom wall 32A). The cup holder device 68 includes a lower holder part 74 that is rotatably fitted over and supported by the central pedestal 32D and also by an interior ledge 32F of the well structure 32 such that the lower holder part 74 is disposed in a spaced relationship above the rear bottom wall 32B of the well structure 32. The cup holder device 68 also includes an upper holder part 76 (FIGS. 1 and 2) that seats and is fastened upon internally-threaded posts 72 (FIGS. 5 and 9) affixed on and extending upright from the lower holder part 74. The upper holder part 76 is thereby carried by the lower holder part 74 along a 360° circular path of rotational travel. The upper holder part 76 extends upwardly through a rear portion 34B of the opening 34 in the top platform 18 to above the top platform 18 of the housing 12, as seen in FIGS. 1 and 2.

The cup holder device 68 also includes multiple lower tubular columns 78 in the lower holder part 74 and multiple upper tubular columns 80 in the upper holder part 76 (FIGS. 1 and 2). The multiple lower and upper tubular columns 78, 80, such as three in number, are vertically aligned with one another. The vertically aligned lower and upper tubular columns 78, 80 also are disposed side-by-side and angularly displaced 120° from one another. The lower and upper tubular columns 78, 80 in the lower and upper holder parts 74, 76 of the cu holder device 68 are open at their opposite ends so as to define passageways 82, 84 through the tubular columns 78, 80 that allow insertion of stacks of cups C through the upper open ends of the upper holder part 76 and also communicate at the lower open ends of the lower holder part 74 with the cup drop chute 66 of the apparatus 22 when successively aligned with a cup dispensing opening 86 in the rear bottom wall 32B of the well structure 32 located below a portion of the cup holder device 68. The lower tubular columns 78 also have vertical outer and inner slots 78A, 78B formed therein which extend between their opposite ends along their outer and inner sides. The inner slots 78B extend from their upper ends and terminate a short distance above their lower ends. The vertical inner slots 78B provide space for insertion and support of the inner cup separator device 88 upon the central pedestal 32D by use of a fastener 90 which extends through a central bore in the lower holder part 74 and threads into the central pedestal 32D. The inner cup separator device 88 cooperates with the outer cup separator device 64, as will be further described hereinafter, to control separation of each lowermost cup LC from its stack as the cup holder device 68 rotatably moves through 120° of the 360° circular path of travel.

The cup dispensing mechanism 62 also includes a second driven gear 92 defined about the lower periphery of the lower holder part 74 of the cup holder device 68 on the top side of a peripheral flange 74A on the lower holder part 74 that overlies an interior ledge 32F in the rear cavity 70 of the well structure 32. The well structure 32 has an opening 93 at the intersection between its front and rear cavities 36, 70 such that as the product dispensing device first driven gear 42 rotates through the 360° circular path of travel, a rear portion thereof and a front portion of the cup dispensing mechanism gear 92 project through the opening 93 between the cavities 36, 70 of the well structure 32 and directly drivingly intermesh, engage or interface with one another. Such intermeshing will cause rotation of the cup holder device 68 through 120° of the 360° circular path of travel, and thus operation of the cup dispenser apparatus 22 through a cup dispensing cycle, upon rotation of the shaft 46 and drive gear 52 thereon by the turning of the handle 48 of the coin-operated actuation mechanism 28 through the 360° circular path of travel of a given actuation cycle to thereby cause the dispensing of the predetermined number of product items from one of the compartments 38B of the dispensing device 38 through the product dispensing opening 40 in the front bottom wall 32A of the well structure 32 and dispensing of a cup from one of the lower tubular columns 78 of the lower holder part 74 of the cup holder device 68 through the cup dispensing opening 86 in the rear bottom wall 32B of the well structure 32 in a manner that a cup C with product P therein will be delivered to an accessible location of the vending unit 14, as will be described hereinafter.

Referring to FIGS. 5-8, the outer cup separator device 64 of the cup dispenser apparatus 22 is incorporated on a bracket 118 described hereinafter. The bracket 118 incorporating the outer cup separator device 64 has an arcuate configuration so as to extend through about a 150° portion of the 360° circular path of travel of the cup holder device 68 such that the bracket 118 overlies as well as is disposed both upstream and downstream of the cup dispensing opening 86 whereas the outer cup separator device 64 overlies and extends a short distance inwardly beyond the outer side of the cup dispensing opening 86 beginning at the upstream end thereof.

The outer cup separator device 64 and the top of the inner cup separator device 88 are disposed in a spaced relationship above the rear bottom wall 32B of the well structure 32 at a height slightly greater than the height of one cup C and in a stationary relationship to the rotatable cup holder device 68. The top level of the outer cup separator device 64 lies in a horizontal plane just below the bottom level of the upper holder part 76 and aligned with the upper level of the lower holder part 74. The outer cup separator device 64 at its inner edge portion 64A extends tangentially to and slightly inwardly across through the outer slots 78A as their respective lower tubular columns 78 rotate past the outer cup separator device 64. The portion of the outer cup separator device 64 that overlies the cup dispensing opening 86 has an arcuate-shaped cam segment 94 defined therealong with a wedge-shaped or tapered entry end 94A that will ensure separation of the lowermost cup C from the next cup C above it in the stack S. To prevent the remaining stack of cups above the lowermost cup LC from also falling downward through the cup dispensing opening 86, the top of the inner cup separator device 88 has a radially outward protruding circular rim portion 88A extending through about 180° opposite from and co-extensive with the inner edge portion 64A of the outer cup separator device 64, The top rim R of the next higher cup C above the lowermost cup C of the two stacks approaching and leaving the location of the cup dispensing opening 86 overlies the inner edge portion 64A of the outer cup separator device 64 and the opposing rim portion 88A of the inner cup separator device 88 so as to support the remaining stack of cups thereon. The rim portion 88A of the inner cup separator device 88 is cut away for about the remaining 180° thereabout so as to withdraw support from the remaining stack of cups during travel through that portion of its circular path opposite from the location of the outer cup separator device 64, allowing the new lowermost cup and remaining stack to drop down onto the rear bottom wall 32B of the well structure 32 such that the top rim R of the new lowermost cup will be just below and thus pass under the inner edge portion 64A of the outer cup separator device 64 as well as below the protruding rim portion 88A of the inner cup separator device 88 in preparation for engaging with the wedge-shaped or tapered entry end 94A of the depending cam segment 94 of the outer cup separator device 64.

The released cup drops downward through the funnel-shaped upper portion 66A of the cup drop chute 66 and into a substantially vertical lower portion 66B thereof until the top rim R of the released cup C encounters a plurality of circumferentially-spaced apart pivotal protrusions or ledges 96 inwardly biased by springs 98 and mounted on pins 100 in recesses 102 near the top of the lower portion 66B of the chute 66, upon which the released cup RC is temporarily seated at an intermediate position about midway down the cu pathway until the product items have dropped into the cup. The weight of the product in the cup is sufficient to overcome the bias of the springs 98 and cause the pivotal ledges 96 to pivot outwardly away from the cup C and allow the cup C with product items therein to drop to the final location behind an exterior access door 104 pivotally mounted on the front of the base 16 of the housing 12 of the vending unit 14 where cup C (FIG. 6) can be removed by the user opening the access door 104.

Referring to FIGS. 4 and 6, the vending unit 14 includes an access door locking mechanism 106 to control access of a user to the location in the base 16 behind the access door 104. The mechanism 106 maintains the access door 104 in a locked condition and thus disabled from providing access by a user until the handle 48 of the coin-operated actuation mechanism 28 is turned through the full 360° circular path of travel of a given actuation cycle such that upon reaching the end of the cycle the access door 104 is converted to an unlocked condition and may be opened by a user who then may reach in and remove the cup with the product items. The access door locking mechanism 106 includes an elongated rod 108 reciprocally mounted through a retainer member 110 secured on the inside surface 104A of the access door 104 and encircled by a spring 112 at a location intermediate the opposite upper and lower ends 108A, 108B of the rod 108. The spring 112 is disposed in a slot 110A in the retainer member 110 in a compressed condition between a collar 108C on the rod 108 and an end of the slot 110A so as to bias the rod 108 upwardly to place the access door 104 in an unlocked condition.

The access door locking mechanism 106 also includes a lock actuation device 114 reciprocally mounted in the base 16 of the housing 12 above and aligned with the rod 108. An upper arm portion 114A of the lock actuation device 114 underlies the peripheral edge portion 56A of the wheel 56 of the coin-operated actuation mechanism 18 such that the peripheral edge portion 56A engages the upper arm portion 114A and depresses the lock actuation device 114 and then the rod 108 downward against the bias of the spring 112 such that the lower end 108B is inserted into a hole 116 in the base 16 of the housing 12 below the access door 104, locking the door against being pivoted away from the housing 12. When the handle 48 of the mechanism 28 has been turned to the end of a complete 360° circular path of travel of a given actuation cycle, the upper arm portion 114A of the lock actuation device 114 becomes aligned with the notch 56B in the peripheral edge portion 56A of the wheel 56, allowing the upper arm portion 114A of the lock actuation device 114 and the rod 108 to move upward due to the bias force of the spring 112 and retract the lower end 108B from the hole 116 in the base 16 of the housing 12. The access door 104 can then be opened and the cup with product therein removed. This arrangement will ensure that the cup cannot be removed prematurely.

The flow of driving torque begins when, after a user deposits the appropriate number of coins into coin slot 60, the user turns the handle 48 of the mechanism 28 clockwise, as viewed in FIG. 1. Turning of the handle 48 rotates the shaft 46 and also rotates the actuation mechanism drive gear 52 and wheel 56 with the shaft 46, the rotation of the latter is counterclockwise as viewed in FIG. 4 which is in a direction opposite to that in FIG. 1. Rotation of the actuation mechanism drive gear 52 rotates the product vending apparatus first driven gear 42 and the product dispensing device 38 therewith which, in turn, rotates the cup dispenser apparatus second driven gear 92 and the cup holder device 68 therewith. The arrangements of the product dispensing device 38 and cup holder device 68 relative to their respective dispensing openings 40, 86 are such that each compartment 38B of the product dispensing device 38 travels over the product dispensing opening 40 before each passageway 82 through the lower holder part 74 of the cup holder device 68 travels over the cup dispensing opening 86; thus, the product items are dropped from the respective compartment 38B into the chute 66 before the cup is dropped from the respective passageway into the chute 66 during the same actuation cycle. However, the vending unit 14 is set up such that the cup released after the product items during the previous actuation cycle, since it is empty, is retained by the pivotal protrusions or ledges 96 at the intermediate position in the chute 66 and thus will receive product items during the succeeding actuation cycle. When the product items drop into the cup their weight added to the cup's weight is sufficient to force outward retraction of the ledges 96, against the opposed biasing force applied by the springs 98, thereby releasing the cup (with the product therein) from the ledges 96 and allowing it to drop to the discharge location behind the access door 104. The next cup then released subsequent to the product items during the same actuation cycle will be retained by the ledges 96, which will have immediately extended toward one another due to the biasing force applied by springs 98, for receiving product during the subsequent actuation cycle.

Figure 9:
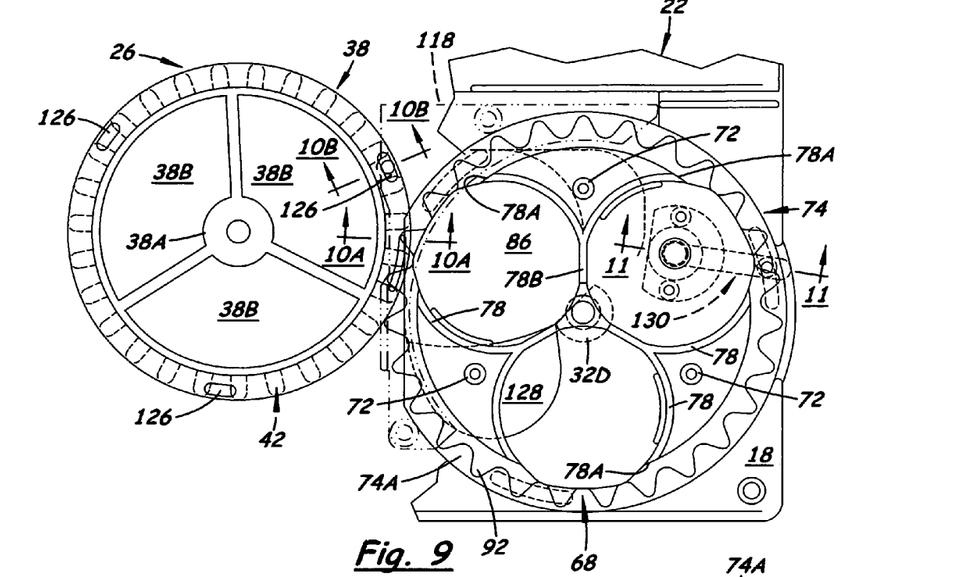
FIG. 9 is an enlarged top plan view of a peripheral first driven gear on the product dispensing device drivingly intermeshed with a peripheral second driven gear on the cup dispensing mechanism of the machine as seen in FIG. 6.

Referring now to FIGS. 5 and 9-14, there is illustrated five features for further enhancing the operation of the sanitized vending machine 10. Referring first to FIGS. 5, 9 and 10A, there is shown a bracket 118 mounted upon recessed shelves along the front and a side of the rear cavity 70 of the well structure 32 in overlying relation to the opening 93 at the intersection of the front and rear cavities 36, 70. Thus, the bracket 118 is spaced above the location of intermeshing of the gear 42 about the lower periphery of the dispensing device 38 with the second driven gear 92 on the lower periphery of the lower holder part 74 of the cup holder device 68. In addition to the above-described cup separator device 64, the bracket 118 incorporates a first of the five operation-enhancing features which is a separation restraint device in the form of an arm 120 attached to and depending from the bracket 118. As best seen in FIG. 10A, the arm 120 terminates just above and in a close positional relationship to an upper side of a flange 38D on the lower periphery portion 38C of the dispensing device 38. On the underside of the flange 38D is formed the first driven gear 42. The function of the depending arm 120 is to ensure that the first and second driven gears 42, 92 cannot separate from their interfacing relationship with one another and thus, in other words, to maintain the driving interfacing or intermeshing engagement of the first and second driven gears 42, 92 with one another.

Figures 10A, 10B, 11:
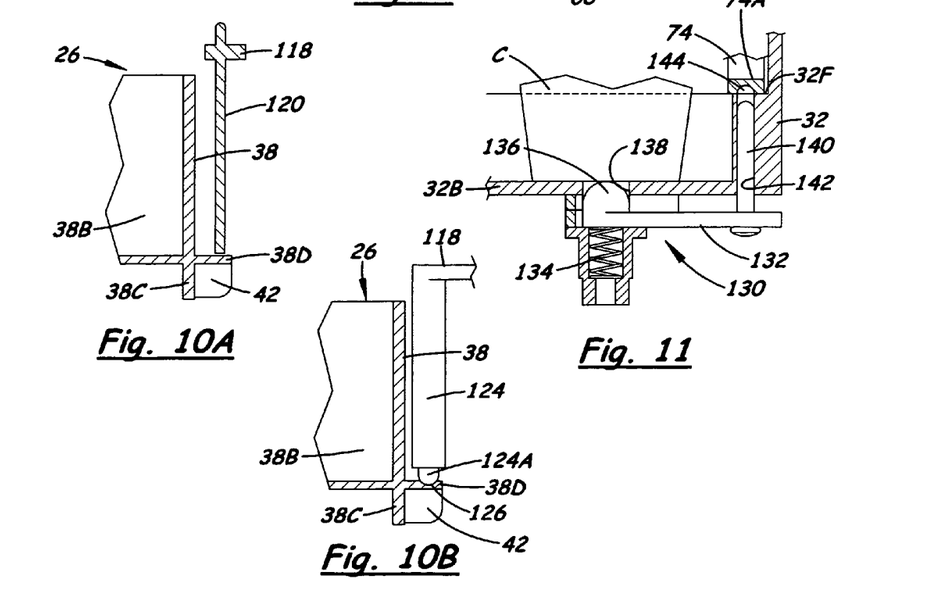
FIG. 10A is a sectional view of a separation restraint device arm taken along line 10A-10A in FIG. 9.
FIG. 10B is a sectional view of a position restraint device rod taken along line 10B-10B in FIG. 9.
FIG. 11 is a sectional view of a cup stack depletion latching device employed in the machine taken along line 11-11 in FIG. 9.

Referring now to FIGS. 5, 9 and 10B, there is shown a second of the five operation-enhancing features which is a position restraint device in the form of a rod 124 having a spring-biased retractable tip 124A. The rod 124 is attached to and depends from the bracket 118 in a spaced relationship from the restraint arm 120 and generally parallel thereto. As best seen in FIG. 10B, the retractable tip 124A is spring biased to protrude downwardly into one of three depressions 126 formed at 120 degree intervals in the top of the flange 38D, marking the end of each product dispensing cycle so as to ensure that the dispensing device 38 is maintained in proper beginning alignment for the start of the next product dispensing cycle. The tip 124A is adapted to retract and permit rotation of the product dispensing device 38 in response to a subsequent actuation cycle.

Referring again to FIG. 9, there is also illustrated a third of the five operation-enhancing features which is in the form of a depression 128 formed in the rear bottom wall 32B of the well structure 32 at the upstream side of the cup dispensing opening 86 therein. The depression 128 ensures that the lowermost cup will release on time from the cup immediately above it as the one stack of cups is moved over the cup dispensing opening 86.

Referring now to FIGS. 9 and 11, there is shown a fourth of the five operation-enhancing features in the form of a latching device 130 mounted to exterior of the rear bottom wall 32B of the well structure 32 downstream from the cup dispensing opening 86. The latching device 130 has a link 132 biased by a spring 134 to move upwardly toward the rear bottom wall 32B. The link 132 at an inner end has attached thereto a first pin 136 which extends through a hole 138 in the rear bottom wall 32B in the path of the stack of cups as they are moved in a circular path upon the wall 32B. The link 132 at an outer end has attached thereto a second pin 140 which extends through a slot 142 formed vertically through the interior ledge 32F on the wall 32B and underlying a peripheral flange 74A of the lower holder part 74 of the cup holder device 68. The second pin 140 is aligned to insert into any one of multiple (three) recesses 144 formed on the underside of the peripheral flange 74A of the lower holder part 74 of the cup holder device 68. The latching device 130 functions to detect depletion of any one of the stacks of cups and in response thereto to stop the ability of the cup holder device 68 to rotate and thereby prevent a user from being able to turn the handle 48 of the coin-operated actuation mechanism 28. The weight of a single last cup of the stack thereof will be enough to depress the first pin 136 and the link 132 and thereby retract the second pin 140 away from above the wall 32B and the recesses 144. However, when the last cup has been used, then the spring 134 causes the first and second pins 136, 140 and the link 132 to elevate and the second pin 140 to protrude into a corresponding one of the recesses 144 and thereby lock the cup holder device 68 in a fixed state.

Figure 12:
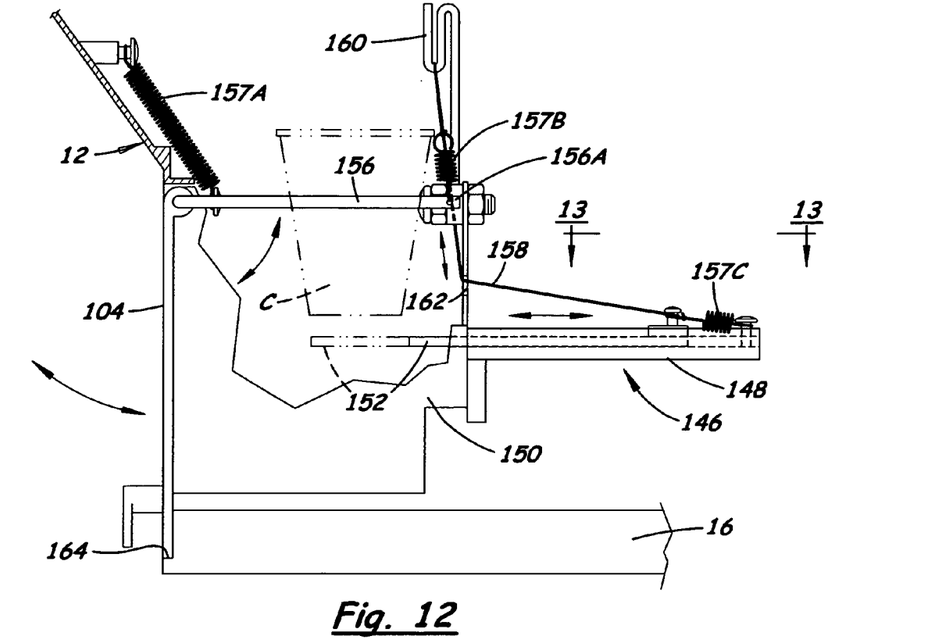
FIG. 12 is a fragmentary side elevational view of the machine with portions broken away to illustrate a cup shielding mechanism employed in the machine.
Figure 13:
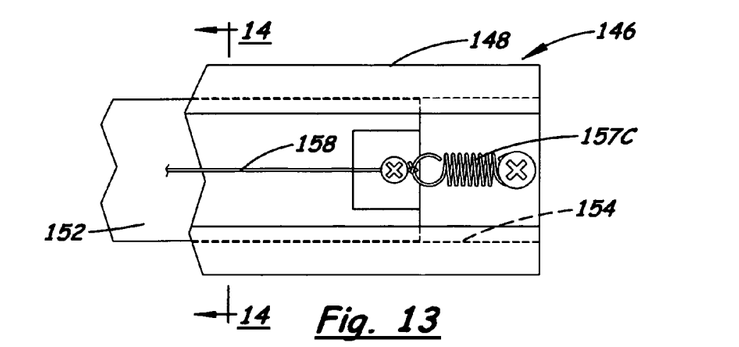
FIG. 13 is a fragmentary top plan view of the cup shielding mechanism as seen along line 13-13 in FIG. 12.
Figure 14:
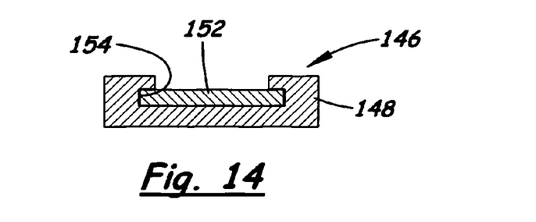
FIG. 14 is a cross-sectional view of the cup shielding mechanism taken along line 14-14 in FIG. 13.

Referring to FIGS. 12-14, there is illustrated a last of the five operation-enhancing features in the form of a cup shielding mechanism 146 which extends and obstructs access, when the unlocked access door 104 is opened by a user, to the next cup that is in position to receive product on the next dispensing cycle. The shield mechanism 146 includes a bed 148 mounted to extend from a bracket 150 upstanding from the base 16 of the housing 12, a track 154 formed on the topside of the bed 148 and a plank 152 slidably mounted in the track 154. The shield mechanism 146 also includes an arm 156 that is fixed to and extends outwardly from the door 104 such that the arm 156 moves with the door 104. The shield mechanism 146 further includes a first spring 157A anchored to the housing 12 and connected to the arm 156 so as to apply a bias force to the arm 156 tending to pivot the door 104 to a closed position as seen in FIG. 12. The shield mechanism 146 still further includes a second spring 157B and cable 158 connected to a rear end 156A of the arm 156 and extending therefrom upwardly and over an elevated hook 160, then downwardly to and through a hole 162 in the bracket 150, then rearwardly to where it is connected the rear end of the plank 152 (or, alternatively only a right angular arrangement of springs between the rear end 156A of the arm 156 and rear end of the plank 152 in place the second spring 157B, cable 158, elevated hook 160 and hole 162 in bracket 150), and a third spring 157C connected between a rear end of the bed 148 and the rear end of the plank 152. This arrangement will cause the plank 152 to slide forwardly to a position underlying the cup when the door 104 is pivoted open and then automatically retract when the door 104 is pivoted closed. This will prevent a user from being able to reach through the opening 164 in the housing 12 when the door 104 is open and contact the next cup and thereby attempt to disrupt the steps involved in filling the next cup with product and dropping it to onto the dispensing location.

It is thought that the present invention and its advantages will be understood from the foregoing description and it will be apparent that various changes may be made thereto without departing from the spirit and scope of the invention or sacrificing all of its material advantages, the forms hereinbefore described being merely exemplary embodiments thereof.

What is claimed is:

1. A sanitized vending machine, comprising:
    a product dispensing mechanism adapted to hold a plurality of product items and rotate through a product dispensing cycle during which said product dispensing mechanism dispenses one or more of product items, said product dispensing mechanism including a first driven gear for undergoing rotation during the product dispensing cycle;
    a cup dispensing mechanism adapted to hold at least one stack of cups and rotate through a cup dispensing cycle during which said cup dispensing mechanism dispenses a cup from the stack to a predetermined position, said respective product and cup dispensing cycles occurring in a predetermined sequence so that the dispensed product items are received in a cup located in the predetermined position, said cup dispensing mechanism including a second driven gear drivingly interfaced with said first driven gear of said product dispensing mechanism for undergoing rotation during the cup dispensing cycle;
    an actuation mechanism including
        a rotatable shaft,
        a drive gear mounted to said shaft so as to undergo rotation with said shaft, said drive gear being drivingly interfaced with said first driven gear of said product dispensing mechanism, and
        a handle mounted to said shaft and adapted to be turned to rotate said shaft and said drive gear therewith through an actuation cycle such that when said handle is turned by a user through the actuation cycle said first and second driven gears respectively rotate with said mechanisms through respective product and cup dispensing cycles; and
    a well structure including front and rear chambers disposed in a tandem relationship and an opening defined in said well structure where said chambers meet one another, said front chamber communicating with a product dispensing opening in a front bottom wall of said well structure, said first driven gear of said product dispensing mechanism being mounted to undergo rotation in said front chamber, said rear chamber communicating with a cup dispensing opening in a rear bottom wall of said well structure, and said second driven gear of said cup dispensing mechanism being mounted to undergo rotation in said rear chamber.

2. The machine of claim 1 further comprising:
a product storage magazine disposed above said product dispensing mechanism such that product items due to the force of gravity drop into a compartment of said product dispensing mechanism to provide one or more of product items in said compartment before said first driven gear and said compartment of said product dispensing mechanism undergo rotation during the product dispensing cycle.

3. The machine of claim 1 further comprising:
an outer cup separator device and an inner cup separator device mounted to said well structure in a spaced relation to one another and adapted to separate a lowermost cup from the stack in a cup holder device of said cup dispensing mechanism so as to enable dispensing the separated cup due to the force of gravity through the cup dispensing opening upon rotation of said cup holder device during the cup dispensing cycle.

4. The machine of claim 3 further comprising:
a depression formed in said rear bottom wall of said well structure at an upstream side of said cup dispensing opening to ensure that the lowermost cup will release on time from the cup immediately above it as the stack of cups is moved over said cup dispensing opening.

5. The machine of claim 1 further comprising:
a cup drop chute disposed below and in communication with the product dispensing opening in said front bottom wall of said well structure and the cup dispensing opening in said rear bottom wall of said well structure, said cup drop chute adapted to guide the dispensed cup to the predetermined position at an intermediate location in said drop chute, between said cup dispensing opening and a discharge location below said cup drop chute, where the cup is temporarily retained awaiting dispensing of product items therein, said cup drop chute also adapted to guide into the temporarily retained cup the predetermined number of product items dispensed from the product dispensing opening, and said cup drop chute further adapted to release the temporarily retained cup with the predetermined number of product items therein and guide the same to the discharge location below said cup drop chute.

6. The machine of claim 5 further comprising:
an access door mounted on said housing and movable between open and closed positions to provide access by a user to a cup containing product items resting at the discharge location in said housing proximate to said access door; and
an access door locking mechanism coupled to said actuation mechanism and adapted to maintain said access door in a locked condition at a closed position until said handle of said actuation mechanism has been turned by a user through the actuation cycle whereupon said access door is converted to an unlocked condition permitting a user to open said access door and remove the cup containing product items.

7. The machine of claim 6 further comprising:
a cup shielding mechanism disposed below said cup drop chute and adapted to obstruct a user through the open access door at the end of a given actuation cycle from being able to reach a cup disposed at the intermediate location in said cup drop chute to receive product items during a next actuation cycle.

8. The machine of claim 1 further comprising:
a separation restraint device disposed above and in close positional relationship to where said first driven gear of said product dispensing mechanism drivingly interfaces with said second driven gear of said cup dispensing mechanism so as to ensure that said first and second driven gears cannot separate from their drivingly interfacing relationship with one another.

9. The machine of claim 1 further comprising:
a position restraint device associated with said product dispensing mechanism to ensure said mechanism is maintained in a proper beginning position for the start of a given product dispensing cycle.

10. The machine of claim 1 further comprising:
a latching device disposed adjacent to said cup dispensing mechanism and adapted to detect depletion of the stack of cups and in response thereto stop said cup dispensing mechanism from being rotated and thereby prevent a user from being able to turn said handle of said actuation mechanism.

11. A sanitized vending machine, comprising:
a housing;
a well structure mounted in said housing, said well structure including front and rear chambers disposed in a tandem relationship and an opening defined in said well structure where said chambers meet one another, said front chamber communicating with a product dispensing opening in a front bottom wall of said well structure, said rear chamber communicating with a cup dispensing opening in a rear bottom wall of said well structure;
a product dispensing mechanism mounted to undergo rotation in said front chamber of said well structure, said product dispensing mechanism including
    at least one compartment adapted to hold one or more product items and dispense the same through the product dispensing opening due to the force of gravity upon rotation of said compartment with said product dispensing mechanism during a product dispensing cycle, and
    a first driven gear defined about a lower peripheral portion of said product dispensing mechanism for undergoing rotation therewith during the product dispensing cycle;
a product storage magazine supported by said housing above said compartment of said product dispensing mechanism such that product items due to the force of gravity drop into said compartment of said product dispensing mechanism to provide one or more product items in said compartment before said first driven gear and said compartment of said product dispensing mechanism undergo rotation during the product dispensing cycle;
a cup dispensing mechanism mounted to undergo rotation in said rear chamber of said well structure, said cup dispensing mechanism including
    a cup holder device adapted to hold at least one stack of cups and dispense the same through the cup dispensing opening due to the force of gravity upon rotation of said cup holder device with said product dispensing mechanism during a cup dispensing cycle, and
    a second driven gear defined about a lower peripheral portion of said cup holder device and drivingly interfaced with said first driven gear on said product dispensing mechanism for undergoing rotation during the cup dispensing cycle;

an outer cup separator device and an inner cup separator device mounted to said well structure in a spaced relation to one another and adapted to separate a lowermost cup from the stack in said cup holder device so as to enable dispensing the separated cup due to the force of gravity through the cup dispensing opening upon rotation of said cup holder device during the cup dispensing cycle;

an access door mounted on said housing and movable between open and closed positions to provide access by a user to a cup containing product items resting at a discharge location in said housing adjacent to said access door;

a cup drop chute mounted in said housing below and in communication with the product dispensing opening in said front bottom wall of said well structure and the cup dispensing opening in said rear bottom wall of said well structure, said cup drop chute adapted to guide the dispensed cup to an intermediate location in said drop chute, between said cup dispensing opening and the discharge location, where the cup is temporarily retained awaiting dispensing of product items therein, said respective product and cup dispensing cycles occurring in a predetermined sequence so that the dispensed product items are received in a cup temporarily retained at said intermediate location, said cup drop chute also adapted to guide into the temporarily retained cup the predetermined number of product items dispensed from the product dispensing opening, and said cup drop chute further adapted to release the temporarily retained cup with the predetermined number of product items therein and guide the same to the discharge location; and an actuation mechanism including
a shaft rotatably mounted to said housing so as to extend between the exterior and interior of said housing,
a drive gear mounted to said shaft in the interior of said housing so as to undergo rotation with said shaft, said drive gear being drivingly interfaced with said first driven gear on said product dispensing mechanism, and
a handle mounted to said shaft at the exterior of said housing and adapted to be turned to rotate said shaft and said drive gear therewith through an actuation cycle such that when said handle is turned by a user through the actuation cycle said first and second driven gears respectively rotate said mechanisms through respective product and cup dispensing cycles.

12. The machine of claim 11 further comprising:
a depression formed in said rear bottom wall of said well structure at an upstream side of said cup dispensing opening to ensure that the lowermost cup will release on time from the cup immediately above it as the stack of cups is moved over said cup dispensing opening.

13. The machine of claim 11 further comprising:
an access door locking mechanism coupled to said actuation mechanism and adapted to maintain said access door in a locked condition at a closed position until said handle of said actuation mechanism has been turned by a user through the actuation cycle whereupon said access door is converted to an unlocked condition permitting a user to open said access door and remove the cup containing product items.

14. The machine of claim 11 further comprising:
a cup shielding mechanism disposed below said cup drop chute and adapted to obstruct a user through the open access door at the end of a given actuation cycle from being able to reach a cup disposed at the intermediate location in said cup drop chute to receive product items during a next actuation cycle.

15. The machine of claim 11 further comprising:
a separation restraint device disposed above and in close positional relationship to where said first driven gear of said product dispensing mechanism drivingly interfaces with said second driven gear of said cup dispensing mechanism so as to ensure that said first and second driven gears cannot separate from their drivingly interfacing relationship with one another.

16. The machine of claim 11 further comprising:
a position restraint device associated with said product dispensing mechanism to ensure said mechanism is maintained in a proper beginning position for the start of a given product dispensing cycle.

17. The machine of claim 11 further comprising:
a latching device disposed adjacent to said cup dispensing mechanism and adapted to detect depletion of the stack of cups and in response thereto stop said cup dispensing mechanism from being rotated and thereby prevent a user from being able to turn said handle of said actuation mechanism.

* * * * *